United States Patent [19]

Hochstrasser

[11] Patent Number: 4,903,943
[45] Date of Patent: Feb. 27, 1990

[54] LEAKPROOF BALL-AND-SOCKET JOINT ARRANGEMENT

[75] Inventor: Ferdinand Hochstrasser, Auenstein, Switzerland

[73] Assignee: KWC AG, Unterkulm, Switzerland

[21] Appl. No.: 393,984

[22] Filed: Aug. 15, 1989

[30] Foreign Application Priority Data

Sep. 1, 1988 [CH] Switzerland ............... 03266/88

[51] Int. Cl.⁴ .................................. F16K 31/44
[52] U.S. Cl. ................................. 251/235; 4/191;
4/194; 4/198; 74/471 R; 74/519; 251/229;
285/261; 285/319; 285/921
[58] Field of Search ............... 4/191, 194, 195, 197,
4/198; 74/471 R, 479, 480 R, 519, 18.1, 18.2;
251/231, 235, 279, 38, 40, 229; 285/261, 268,
269, 271, 319, 921; 403/128, 129, 130

[56] References Cited

U.S. PATENT DOCUMENTS

| | | | |
|---|---|---|---|
| 2,317,898 | 4/1943 | Fensch et al. | 4/191 |
| 2,486,246 | 10/1949 | Beeke | 251/235 |
| 2,506,096 | 5/1950 | Marshall | 285/271 |
| 2,553,991 | 5/1951 | Wagner et al. | 251/231 |
| 2,784,987 | 3/1957 | Corcoran | 285/319 |
| 2,850,042 | 9/1958 | Strazdins | 251/235 |
| 3,292,955 | 12/1966 | Luther | 285/261 |
| 3,314,083 | 4/1967 | Minella | 4/198 |
| 3,353,192 | 11/1967 | Christiansen | 251/235 |
| 4,275,907 | 6/1981 | Hunt | 285/319 |
| 4,451,069 | 5/1984 | Melone | 285/921 |

FOREIGN PATENT DOCUMENTS

| | | | |
|---|---|---|---|
| 771559 | 10/1934 | France | 4/197 |
| 1395727 | 12/1965 | France | 4/195 |
| 198534 | 9/1965 | Sweden | 4/197 |
| 153146 | 3/1932 | Switzerland | 4/197 |

*Primary Examiner*—George L. Walton
*Attorney, Agent, or Firm*—Barnes & Thornburg

[57] ABSTRACT

A housing for a discharge valve includes a hollow cylindrial socket which projects in the radial direction, and in which a siphon an actuating pin for control of the valve stopper is mounted in a leakproof manner in a ball-and-socket joint arrangement. A spherical part enclosing an intermediate portion of the actuating pin is received in a ball socket recess in a holding element, which is snapped onto the socket in a leakproof manner. The ball socket recess has on the outer side a spherizone type sealing surface on which an O-ring slides. A set of fingers of the holding element partially enclose the spherical part and press it with a specific force against the sealing surface.

10 Claims, 1 Drawing Sheet

LEAKPROOF BALL-AND-SOCKET JOINT ARRANGEMENT

BACKGROUND OF THE INVENTION

The present invention relates generally to discharge valves for washbasins and other fixtures, and more specifically to a ball-and-socket joint arrangement for easy and leakproof introduction of a swivel movement of a siphon or actuating pin or other lever into the interior of the sanitary discharge valve housing or the like.

Discharge valves of washbasins and tubs frequently have ball-and-socket joint arrangements in order to introduce a control movement coming from a control fitting for raising or lowering a valve stopper from the outside into the inside of the valve housing. These valve housings have a tubular socket projecting laterally approximately in the horizontal direction, on the free end region of which a spherical zone type of sealing surface is provided. Resting against the sealing surface is a plastic ball which sits on a siphon pin for the valve stopper. A screw cap, also having a spherical zone type of contact surface resting against the spherical part, is screwed on the socket, for the purpose of pressing the spherical part against the sealing surface.

Since the forces acting on the siphon or actuating pin for the control of the valve are very small, the screw cap must not be screwed too tight. The result of this is that, in particular where the discharge is blocked downstream of the socket, the ball-and-socket joint arrangement is not leakproof or, if the screw cap is tightened to achieve a leakproof seal, the discharge valve cannot be operated anymore. Additionally, the known ball-and-socket joint arrangements are expensive to manufacture and install.

The object of the present invention is therefore to propose a ball-and-socket joint arrangement for leakproof introduction of a swivel movement of the siphon pin into the interior of a drain housing which is reliably leakproof and is still easy to operate, and which is less expensive to manufacture and simpler to install.

SUMMARY OF THE INVENTION

This object is achieved by providing a holding element having a spherical zone sealing surface formed therein for sealing against an outside surface of a ball joint or other spherical part. The holding element includes pressing means for pressing the spherical part against the contact surface to achieve a sealed arrangement therebetween. The holding element also includes a separate fastening means for fastening the holding element to the drain housing.

Since both the spherical zone type of sealing surface and the pressing means pressing the spherical part against the sealing surface are formed in the holding element, the pressing of the spherical part against the sealing surface is always insured, irrespective of the fastening of the holding element on the housing. In this way an easy movement of the spherical part and a reliable seal in the region of the sealing surface are maintained. Furthermore, the spherical part connected to a control element can now be pre-assembled together with the holding element to a sub-assembly, and this sub-assembly can subsequently be fixed directly on the drain housing by means of the fixing means, which greatly simplifies the fitting.

In a preferred embodiment, a reliable sealing is ensured even in the event of great pressure differences as the spherical part acted upon by pressure from the interior of the drain housing is pressed against the sealing surface with an additional force proportional to the excess pressure.

In a preferred embodiment wherein the contact surface is elastically deflectable, the spherical part can be slotted without any problem into the one-piece holding element. In another preferred embodiment, a tubular socket gripping round the holding element in the region of the pressing means prevents elastic deflection of the pressing means in the form of fingers, which ensures definite pressure of the spherical part against the sealing surface in all conditions.

A particularly simple installation is provided in one embodiment wherein the holding element snaps onto the socket, and thus threads do not have to be formed either on the socket or on the holding element. This simplifies the manufacture and can ensure a precisely defined position of the holding element relative to the socket.

A particularly leakproof ball-and-socket joint arrangement is achieved by providing a groove containing a sealing element on the holding element or on the spherical part in the region of the sealing surface. The sealing element in this embodiment either glides on the surface of the spherical part or on the sealing surface on the holding element.

Ball-and-socket joint arrangements are used in a preferred manner according to the invention in sanitary discharge valves for leakproof introduction of a siphon pin controlling a valve stopper into the interior of discharge valve housings.

BRIEF DESCRIPTION OF THE DRAWINGS

The present invention will now be explained in greater detail with reference to a preferred embodiment shown schematically in the drawings.

DESCRIPTION OF THE PREFERRED EMBODIMENTS

Figure 1:
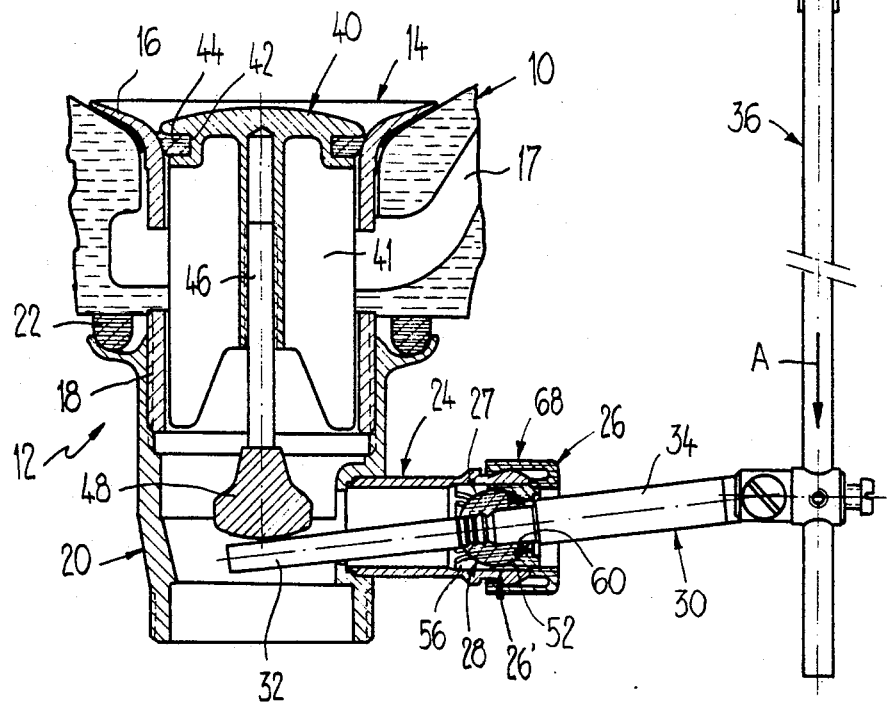
FIG. 1 shows a discharge valve of a washbasin with a ball-and-socket joint arrangement of the present invention.

A generally known discharge valve 12 is provided in the outlet area of an only partially shown washbasin 10. The discharge valve 12 has an essentially hollow cylindrical upper housing part 14 which passes through the wall of the washbasin 10. The housing wall of the washbasin 10 and opens in a known manner into the upper housing part 14. An external thread is provided at a bottom end region 18 of the upper housing part 14 which projects downwards through the washbasin 10 and screws into an essentially hollow, cylindrical, housing part 20 with a corresponding internal thread. An annular washer 22 is provided between the upper end of the lower housing part 20 and the washbasin 10.

A tubular socket 24 is fitted on the lower housing part 20, the tubular socket having a longitudinal axis projecting in the radial direction from the tubular lower housing part 20. A holding element 26 with its essentially cylindrical part 26' is inserted in the form of a plug into the free end 66 of the socket 24 away from the lower housing part 20. The cylindrical part 26' has a recess 27, defining a spherical zone sealing surface, in which a spherical part 28 is mounted. The spherical part 28 rests on a twin-armed siphon or actuating pin 30 which passes through the holding element 26 approximately in its longitudinal direction. The inner arm 32 of the siphon or actuating pin 30 extends into the interior of the lower housing part 20, while its outer arm 34 is operatively connected by means of a rod 36 to a fitting 38, shown only schematically, by which the rod 36 can be manipulated.

An essentially mushroom-shaped valve stopper 40 with radially running, wing-shaped guide elements 41 is guided so that it slides in the vertical direction in the upper housing part 14. A circular groove 42 is provided at the outer edge of the valve stopper 40 in which an annular washer 44 is arranged. The washer 44 rests against the funnel-shaped flare of the upper housing part 14. A bolt 46 is screwed into the bottom of the valve stopper 40. The bottom end of bolt 46 includes a head-shaped thickened part 48 which rests against the inner arm 32 of the siphon pin 30.

Upon movement of the rod 36 in the direction of the arrow A, the siphon pin 30 is swung around the spherical part 28 in the clockwise direction, the result of which is that the valve stopper 40 is raised, and water can run out of the washbasin 10. If the rod 36 is moved in the opposite direction to the arrow A, the siphon pin 30 is swung back again in the counterclockwise direction into the position shown in FIG. 1, thereby causing the valve stopper 30 to lower by its own weight following the movement of the free end region of the inner arm 32 of the siphon pin 30, until the washer 44 is again resting against the funnel-shaped flare 16 of the upper housing part 14.

Figure 2:
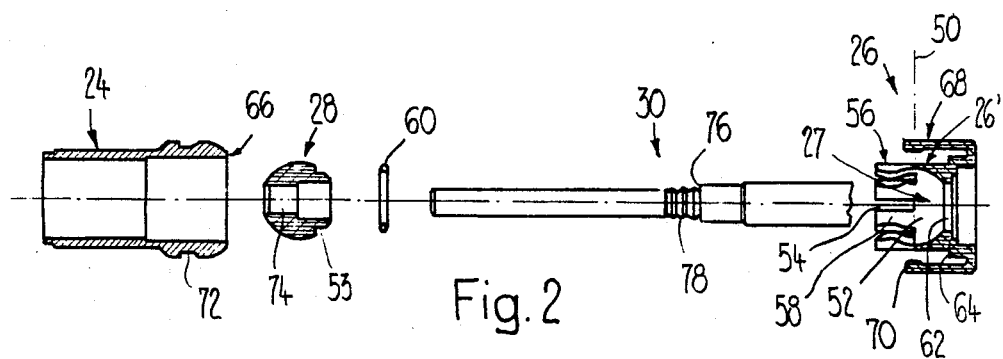
FIG. 2 shows an exploded view of the ball-and-socket joint arrangement shown in FIG. 1.

The recess 27 in the cylindrical part 26' of the holding element 26 includes sealing surface 52 in the form of a spherical zone. The spherical zone sealing surface 52 is situated outside a plane 50 running through the center point of the spherical part 28 and at right angles to the longitudinal axis of the holding element 26 (see in particular FIG. 2). On the inside of the plane 50, slits 54 are provided, extending from the inner end of the holding element 26 facing the inside of the socket 24 into the region of the plane 50, and running essentially in the axial direction and passing through in the radial direction. The slits 54 bound deflectable fingers 56 in the radial direction. These fingers 56 partially grip round the spherical part 28, viewed in the axial direction of the holding element 26, and with their contact surfaces 58 provide pressing means pressing the spherical part 28 against the spherical zone sealing surface 52 (see FIG. 2). In the free end region the fingers 56 are flared in a conical shape at their inner side, in order to permit problem-free introduction of the spherical part 28 into the ball socket recess 27.

In the region of the sealing surface 52 the spherical part 28 has a circular groove 53 in which an O-ring 60 is disposed. The swivel angle of the siphon pin 30, and thus also of the spherical part 28, is limited, by a following circular rib 62 bounding the sealing surface 52 in the direction towards the outside of the ball socket recess 27, in such a way that the O-ring 60 never runs off the sealing surface 52.

The cylindrical part 26' of the holding element 26 inserted in the form of a plug into the socket 24 is bounded on the outside by a circular edge 64 projecting in the radial direction. Said edge 64 rests against the end 66 of the socket 24 formed as an annular stop face. The holding element 26 has a hollow cylindrical covering element 68, integral with the cylindrical part 26' at the outer end region of the holding element 26, which is radially spaced outwardly from and partially encloses the cylindrical part 26' in the axial direction. This covering element 68 grips round the free end region of the socket 24 and snaps with a circular bead 70 into a corresponding groove 72 in the socket 24. The surfaces of this bead/groove snap connection resting against each other are conically shaped in such a way that the edge 64 is pulled against the free end 66 of the socket 24.

In order to permit rapid and precise fitting, a cylindrical recess 74 in the spherical part 28 has a step-type flare which comes to rest against a corresponding taper 76 on the siphon pin 30. A saw-tooth-shaped ribbing 78 ensures a secure seating of the pressed-on spherical part 28 to the siphon pin 30. The O-ring 60 is subsequently placed in the circular groove 53 on the spherical part 28, and the spherical part 28 is placed together with the O-ring 60 and the siphon pin 30 in the ball-type recess 27 of the holding element 26. In the process the fingers 56 spread apart elastically and subsequently, with their contact surfaces 58, press the spherical part 28 or the O-ring 60 with a specific force against the sealing surface 52. Thus the pre-assembled sub-assembly is now placed like a plug in the socket 24, and the covering element 68 is engaged into the groove 72, as shown in FIG. 1. Since the fingers 56 and the inner circumferential surface of the hollow cylindrical socket 24 are in good contact, spreading out of the fingers 56 is prevented, which ensures precisely defined contact of the O-ring 60 or of the spherical part 28 on the sealing surface 52 during the entire service life of the ball-and-socket joint arrangement. The spherical part 28 and the holding element 26 are preferably injection molded parts made of plastic. They can be manufactured simply and with extreme precision.

What is claimed is:

1. An actuating pin mounting assembly for leakproof introduction of an actuating pin into the interior of a valve housing, the mounting comprising:
   a tubular socket projecting laterally from a valve housing, a generally spherical part for engagement with an intermediate portion of an actuating pin, and a one piece holding element for holding the generally spherical part, the holding element comprising:
   fastening means for fastening the holding element to the tubular socket, a spherical zone sealing surface formed in the holding element for sealing against an outside surface of the generally spherical part, and resilient pressing means extending from the sealing surface and integral thereto, said spherical part being received in the pressing means for pressing the spherical part against the sealing surface to achieve a sealed arrangement therebetween prior to the fastening means fastening the holding element to the tubular socket.

2. The actuating pin mounting assembly of claim 1 wherein the sealing surface comprises an annular ring having a spherical inside surface facing toward the tubular socket.

3. The actuating pin mounting assembly of claim 1 wherein the pressing means comprises several elastically deflectable fingers, each finger contacting an inner surface of the spherical part for biasing the spherical part toward the sealing surface.

4. The actuating pin mounting assembly of claim 1 wherein an inner surface of the tubular socket engages an outer surface of the pressing means.

5. The actuating pin mounting assembly of claim 1 wherein the pressing means is substantially enclosed by the tubular socket, and the fastening means includes a snap closure for securing the holding element at a predetermined position with respect to the tubular socket.

6. The actuating pin mounting assembly of claim 5 wherein a distal end of the socket comprises an annular stop face, and the holding element comprises a counterface pressed by means of the snap closure into contact with the annular stop face of the socket.

7. The actuating pin mounting assembly of claim 1 wherein the generally spherical part includes a groove containing a sealing element confronting the sealing surface.

8. The actuating pin mounting assembly of claim 7 wherein the sealing element comprises an O-ring.

9. An actuating pin mounting sub-assembly for leakproof introduction of an actuating pin into the interior of a valve housing, including a tubular socket projecting laterally from the valve housing, the sub-assembly comprising: an actuating pin having an intermediate portion situated between two opposite ends, a generally spherical part engaging the intermediate portion of the actuating pin, and a one piece holding element for holding the generally spherical part, the holding element including: fastening means for fastening the holding element to the tubular socket, a spherical zone sealing surface formed in the holding element for sealing against an outside surface of the generally spherical part, and resilient pressing means extending from the sealing surface and integral thereto, said spherical part being received in the pressing means for pressing the spherical part against the sealing surface to achieve a sealed arrangement therebetween prior to the fastening means fastening the holding element to the tubular socket.

10. The actuating pin mounting sub-assembly of claim 9 wherein the fastening means comprises a snap closure for securing the holding element at a predetermined position with respect to the tubular socket.

* * * * *

UNITED STATES PATENT AND TRADEMARK OFFICE
CERTIFICATE OF CORRECTION

PATENT NO. : 4,903,943

DATED : February 27, 1990

INVENTOR(S) : Ferdinand Hochstrasser

It is certified that error appears in the above-identified patent and that said Letters Patent is hereby corrected as shown below:

At the bibliography page, in the ABSTRACT, line 3, please delete "a siphon"; and At column 2, line 51, after the word "housing", please insert --part 14 has an upper end region 16 which is widened in a funnel shape which rests closely against the inside of the washbasin 10. An overflow 17 is disposed in the--.

Signed and Sealed this

Seventh Day of May, 1991

*Attest:*

HARRY F. MANBECK, JR.

*Attesting Officer*        *Commissioner of Patents and Trademarks*